(12) United States Patent
Richter et al.

(10) Patent No.: US 11,347,591 B2
(45) Date of Patent: May 31, 2022

(54) CUMULATIVE BACKUPS

(71) Applicant: EMC IP Holding Company LLC, Hopkinton, MA (US)

(72) Inventors: Mark Richter, Laguna Woods, CA (US); Jennifer Starling, Lake Forest, CA (US); Eric Olsen, Lake Forest, CA (US); Emile Snyder, Talent, OR (US)

(73) Assignee: EMC IP Holding Company LLC, Hopkinton, MA (US)

( * ) Notice: Subject to any disclaimer, the term of this patent is extended or adjusted under 35 U.S.C. 154(b) by 163 days.

(21) Appl. No.: 16/001,738

(22) Filed: Jun. 6, 2018

(65) Prior Publication Data

US 2018/0285435 A1    Oct. 4, 2018

Related U.S. Application Data

(63) Continuation of application No. 14/334,327, filed on Jul. 17, 2014, now Pat. No. 10,037,371.

(51) Int. Cl.
*G06F 11/14* (2006.01)
(52) U.S. Cl.
CPC .............................. *G06F 11/1402* (2013.01)
(58) Field of Classification Search
CPC .. G06F 11/1412; G06F 11/14; G06F 11/1402; G06F 11/1415
See application file for complete search history.

(56) References Cited

U.S. PATENT DOCUMENTS

| | | | |
|---|---|---|---|
| 9,195,546 B1* | 11/2015 | McAlister | G06F 11/1469 |
| 2003/0182326 A1 | 9/2003 | Patterson | |
| 2004/0107381 A1* | 6/2004 | Bomfim | G06F 16/22 714/4.12 |
| 2004/0139127 A1* | 7/2004 | Pofelski | G06F 11/1471 |
| 2007/0186068 A1* | 8/2007 | Agrawal | G06F 11/1456 711/162 |
| 2011/0218967 A1 | 9/2011 | Sliger | |
| 2012/0078851 A1 | 3/2012 | Pinault | |
| 2013/0110969 A1 | 5/2013 | Wertheimer | |
| 2013/0198557 A1* | 8/2013 | Bensinger | G06F 11/1469 714/3 |
| 2014/0074790 A1* | 3/2014 | Berman | G06F 11/1448 707/649 |

(Continued)

OTHER PUBLICATIONS

U.S. Appl. No. 14/334,327, filed Jul. 17, 2014, Richter, et al..

(Continued)

*Primary Examiner* — Jay A Morrison
(74) *Attorney, Agent, or Firm* — Workman Nydegger

(57) ABSTRACT

In one example, a method includes performing various operations at a backup server. These operations may include receiving, from a node, a request for restoration of a cumulative backup that includes a plurality of partial backups that have been merged together, where the plurality of partial backups includes data from a group of one or more nodes, and the group includes the node. The method further includes checking the cumulative backup to determine whether or not the cumulative backup has been finalized, accessing the cumulative backup when it has been determined that the cumulative backup has been finalized, and restoring the cumulative backup to a target node.

16 Claims, 11 Drawing Sheets

(56) References Cited

U.S. PATENT DOCUMENTS

2014/0164330 A1* 6/2014 Barnes ............... G06F 11/1451
707/646
2015/0186217 A1 7/2015 Eslami Sarab

OTHER PUBLICATIONS

Hu et al., "Failure Handling in an Optimized Two-Safe Approach to Maintaining Remote Backup Systems," Proc of the 17th IEEE Symp on Reliable Distributed Systems, vol. 167, 1998.
U.S. Appl. No. 14/334,327, filed May 20, 2016, Office Action.
U.S. Appl. No. 14/334,327, filed Nov. 16, 2016, Final Office Action.
U.S. Appl. No. 14/334,327, filed Mar. 13, 2017, Office Action.
U.S. Appl. No. 14/334,327, filed Sep. 28, 2017, Final Office Action.
U.S. Appl. No. 14/334,327, filed Mar. 29, 2018, Notice of Allowance.

* cited by examiner

CUMULATIVE BACKUPS

RELATED APPLICATIONS

This application is a continuation of, and hereby claims priority to, U.S. patent application Ser. No. 14/334,327, entitled CUMULATIVE BACKUPS, and filed Jul. 17, 2014. All of the aforementioned applications are incorporated herein in their respective entireties by this reference.

FIELD OF THE INVENTION

Embodiments of the present invention generally concern backing up and restoring data. More particularly, embodiments of the invention relate to systems, hardware, computer-readable media, and methods for backing up data in an efficient manner.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

While systems, hardware, computer-readable media, and methods for backing up and/or restoring data provide important functionality to the entity for whose benefit they are employed, the particular manner in which they are executed can result in the introduction of certain problems.

For example, backup processes performed in an environment that include multiple clients may cause the generation of one, or more, backups for each of the clients every time the backup process is performed. However, these backups can take a significant amount of storage space, particularly when multiple backup processes are performed over a period of time that result in the generation of multiple backups for each client or other node. This situation becomes even more problematic in environments where the backups are maintained in storage for an indefinite period of time. Moreover, these backups occupy storage space that could otherwise be used for other purposes. While additional storage space can be purchased, the additional storage space may be expensive, and introduces further maintenance and other costs as well.

Another example of a problem that can arise in connection with backup processes that involve multiple clients' attempts to reduce the amount of storage space required for the backup. In particular, the individual backups created for each client or other node in a group may, in some instances, be combined in some fashion in an attempt to reduce the amount of storage space ultimately required. However, such an approach does not eliminate the requirement to store each of the individual backups until such time as they can be combined. Moreover, the combined backup cannot be created until all of the individual backups have been created and stored. Thus, this approach to creating a combined backup so as to reduce storage space requirements can result in relatively long backup windows that consume system resources which could be used for other purposes.

In light of the foregoing, it would be helpful to reduce the amount of storage space required by backups of multiple nodes. As well, it would be desirable to be able to reduce the backup window required by a backup process that spans multiple nodes.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
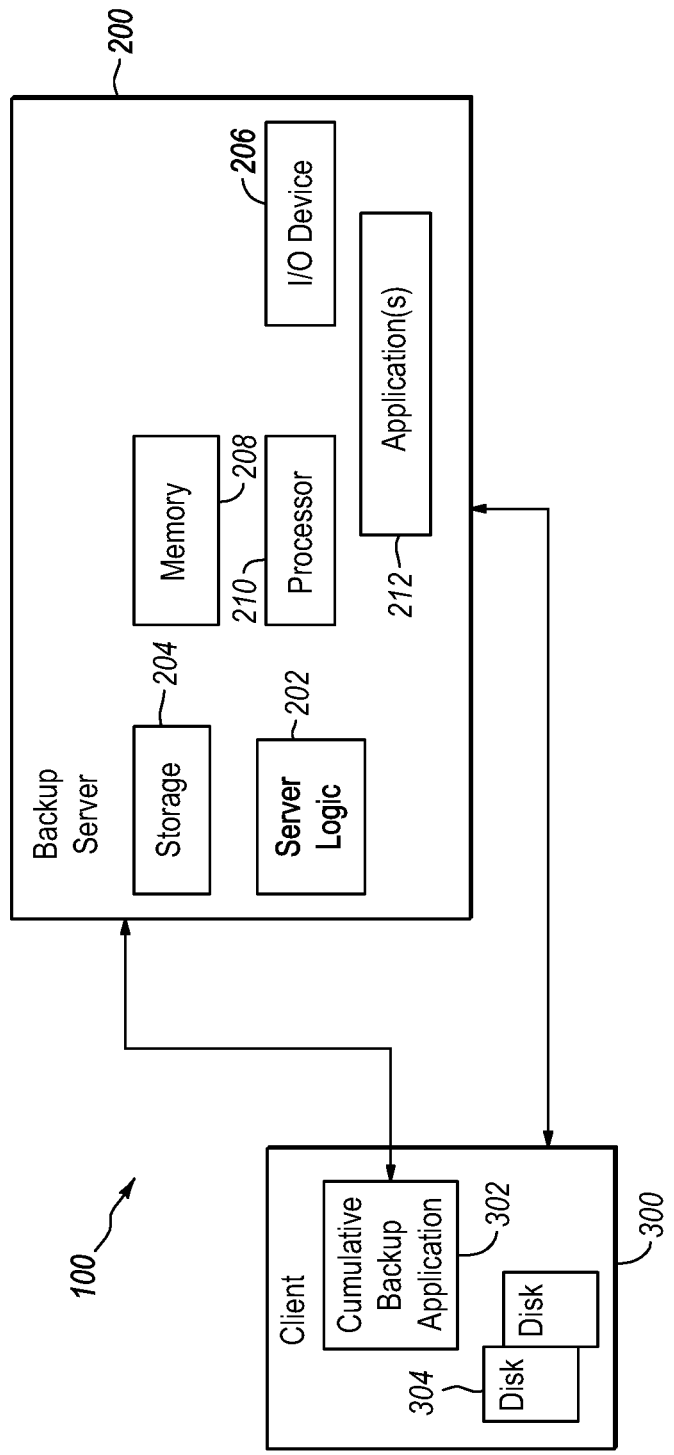
FIG. 1 is directed to aspects of an example operating environment for at least some embodiments of the invention.

Embodiments of the present invention generally concern backing up and restoring data. At least some embodiments are employed in clustered environments. More particular example embodiments of the invention relate to systems, hardware, computer-readable media and methods for backing up data in a manner that is relatively efficient in terms of the time required to perform the backup and/or in terms of the storage space required for the backup.

In at least some embodiments, a backup process is performed that is concerned with backing up data from one or more sources, such as each node of a target group of nodes. Depending upon the circumstances, each node in the target group may be backed up either in whole, or in part.

After the nodes have been identified, and the data to be backed up from each node has been selected, the backup process can begin. In at least some embodiments, the backup process proceeds substantially in parallel with respect to the nodes of the target group such that the data at each node is backed up at substantially the same time as the respective data of the other nodes is backed up. The backup of each node or its respective portion may be referred to herein as a partial backup.

As the partial backups are created at each node, they are stored on the server and merged together to collectively form a cumulative backup that occupies only a single slot in the accounting system of an associated backup server. The partial backups are synchronized as they are merged into the cumulative backup on the server so as to help ensure that no parts of any partial backup are lost due to race conditions or conflicts. When all of the partial backups have been merged together and the cumulative backup is complete, the cumulative backup is sealed to prevent further changes.

Although the cumulative backup is stored, the individual partial backups are not stored as separate entities, except insofar as they are incorporated into the cumulative backup.

Thus, this cumulative backup approach can provide a relative reduction in storage requirements associated with a backup process by eliminating the need to store both the cumulative backup, as well as the individual backups for each node. Correspondingly, the need to reserve respective slots for each partial backup in the accounting system of the backup server is eliminated. Moreover, the cumulative backup process may proceed relatively more quickly than a backup that requires both creation and storage of partial backups before a final complete backup can be created.

As may be evident from the preceding discussion, and other disclosure herein, embodiments of the invention may provide various advantages, although it is not necessary, or required, that any particular embodiment(s) provide any particular advantage(s). Moreover, and consistent with the foregoing statement, embodiments within the scope of one or more claims may additionally, or alternatively, provide one or more advantages not specifically enumerated herein. Finally, to the extent that possible advantages are enumerated herein, those may be present in one or more embodiments in any combination.

A. Example Operating Environments

In general, embodiments of the invention may include and/or be implemented in an operating environment that includes a target group having one or more nodes that each include data desired to be backed up together in the form of a single unified backup.

One or more applications may be hosted by one or more of the nodes of the operating environment, and the applications may generate and/or cause the generation of data that is desired to be backed up and restored. As used herein, the term data is intended to be construed broadly and includes, by way of example and not limitation, data blocks, atomic data, objects, files, directories, volumes, and any group of one or more of the foregoing.

As the nodes in the operating environment may each operate autonomously, and in connection with different respective databases and/or other data stores, cumulative backup applications and methods are employed in various embodiments. In general, the cumulative backup approach involves the use of one or more instances of a cumulative backup application to create backups of at least a part of one or more nodes and merging the partial backups, as they are created, into a cumulative backup. The cumulative backup is stored at the server, and all users in the operating environment have access to all the data in the cumulative backup. The integrity of the individual databases of each node is maintained because that data has no connection to the backed up data.

In at least some embodiments, a respective instance of the cumulative backup application is hosted by each node that participates, or may, in a cumulative backup. The instance(s) of the cumulative backup application operate in connection with logic at the backup server that implements various operations concerning the cumulative backup and partial backups. For example, the logic at the backup server may initiate the backup by communicating with the cumulative backup application at each node in a target group, and can also provide synchronization services with regard to the respective partial backups created by each instance of the cumulative backup application.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. For example, one or more nodes, discussed below, may comprise elements of a cloud computing environment. The environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a backup server 200 configured for communication with one or more nodes, such as one or more clients 300. In general, cumulative backups can be restored to the client 300 and/or any other desired machine. The backup server 200 and client 300 may be physical machines, virtual machines, or any other suitable type of device.

With particular reference first to the backup server 200, some embodiments may employ a backup server 200 in the form of an EMC Avamar server or EMC NetWorker server, although the scope of the invention is not limited to those example servers. The backup server 200 includes server logic 202 that participates in the generation of cumulative backups. The backup server 200 further includes storage 204 where one or more cumulative backups can be stored. In addition to the server logic 202 and storage 204, the backup server 200 may also include an I/O device 206, memory 208, and one or more processors 210. As well, one or more applications 212 may be provided that comprise executable instructions.

One or more of the nodes, such as client 300, with which the backup server 200 communicates can take the form of a server, such as a mail server, examples of which include a Lotus Notes server, and an MS Exchange server. However, it is not required that any server be a mail server or any other particular type of server. In some embodiments, the relation between two or more nodes may be such that the nodes should be backed up together. Such groups of nodes include, for example, machine databases, MS Exchange servers, and VMWare applications.

One or more of the client(s) 300 include a cumulative backup application 302 that generally operates in cooperation with the server logic 202 of the backup server 200 to create one or more cumulative backups that include data that is resident on storage media 304, such as disks for example, of the client 300. A variety of different backup applications can be used for the cumulative backup process, and with an associated restore process. One example is the EMC Avtar cumulative backup application, which is an Avamar Windows backup client. However, other backup applications can alternatively be employed in connection with one or more embodiments of the invention.

B. Cumulative Backup—Single Node

With reference now to FIGS. 2-5, and with continued attention to FIG. 1, details are provided concerning an example system configuration, and associated cumulative backup operations that can be performed in connection with that configuration. Except as may be noted elsewhere herein, the operating environment 600 of FIGS. 2-5 may be the same, or identical, to the operating environment disclosed in FIG. 1 and, accordingly, the discussion of FIG. 1 is applicable as well to FIGS. 2-5.

Figure 2:
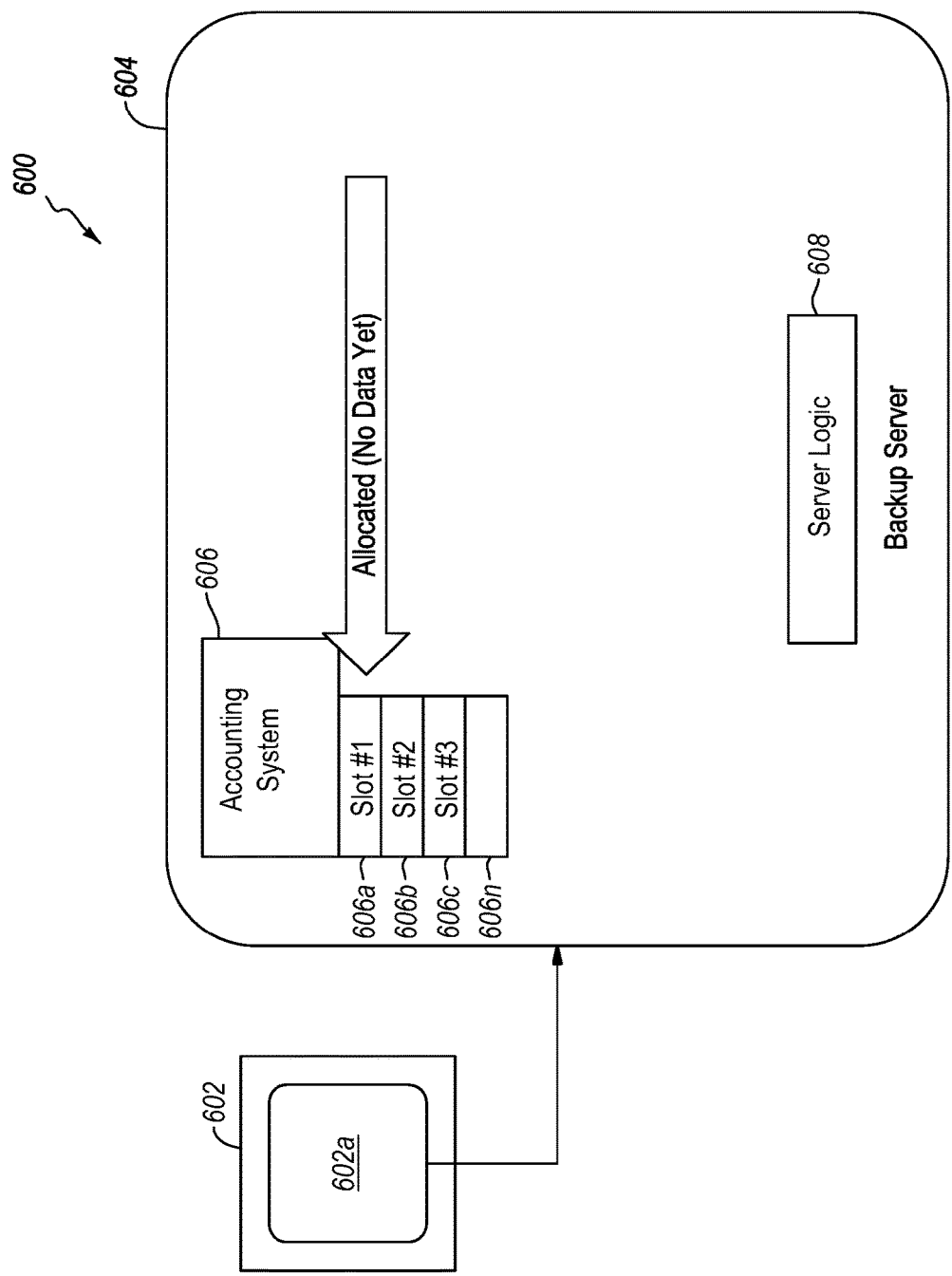
FIGS. 2-5 disclose aspects of an example backup system configuration and associated methods.

As indicated in FIG. 2, directed in part to the initial creation of a cumulative backup, the operating environment 600 may include one or more nodes 602 that each host an instance of a cumulative backup application 602a, such as the EMC Avtar application for example. There is no upper limit to the number of nodes 602 that can participate in a cumulative backup, and a cumulative backup can be performed using as few as one node 602. The node(s) 602, one or more of which may comprise, for example, a mail server such as an MS Exchange server, or a Lotus Notes server, communicate with a backup server 604, which can take the form of an EMC Avamar server. In general, the node(s) 602 that will participate in the cumulative backup, and the data to be included in the partial backup 610 can both be user specified, such as by way of server logic 608 at the backup server, at the node 602, and/or by way of a user interface (UI) at a management console server (MCS).

The backup server 604 includes an accounting system 606 that has, or is otherwise associated with, a plurality of slots 606a, 606b, 606c . . . 606n, each of which can be allocated for storage of a backup. In the example of FIG. 2, slot 606a (#1) has been allocated but no data has been stored yet in slot 606a. Allocation of slot 606a can be performed by the server logic 608 of the backup server 604 at the direction of the cumulative backup application 602a. The logic for requesting allocation of a slot 606 may form part of the cumulative backup application 602a, and a slot, when allocated, can serve as a unique identifier for the backup that is stored there.

At, or about, the same time that the request for allocation of a slot is made, the cumulative backup application 602a also indicates to the backup server 604 that the backup to be stored in the slot is a 'partial' backup. Among other things, this designation as 'partial' permits one or more instances of the cumulative backup application 602a to merge data into the data stored in the allocated slot. In at least some embodiments, this marking of the backup in the slot is accomplished with the use of a 'hidden' flag.

In addition to identifying the backup in the slot as a 'partial' backup, the 'hidden' flag also ensures that the partial backup will not appear in a list of existing backups at the backup server 604 unless a special flag is present in the command that that is used to obtain that listing, although certain information about the partial backup may still be accessed even if the 'hidden' flag has been set. Such information includes, but is not limited to, Backup ID, Backup Creation Time, and Backup Label. For example, if an inquiry is made using Backup ID as a criterion, the Backup ID of the 'partial' backup will appear in the list of results.

It should be noted that any such access is to the cumulative backup as a whole as that cumulative backup exists at the time of access, and not to the constituent partial backups that have been combined to make up the cumulative backup. This is due to the fact that the cumulative backup, when created, exists as a single unified entity and not as a group of discrete partial backups.

In any event, when the cumulative backup that includes the partial backup is completed, the 'hidden' flag can be reset, by a cumulative backup application 602a for example, and the cumulative backup can then be viewed without the need for any special flags.

Figure 3:
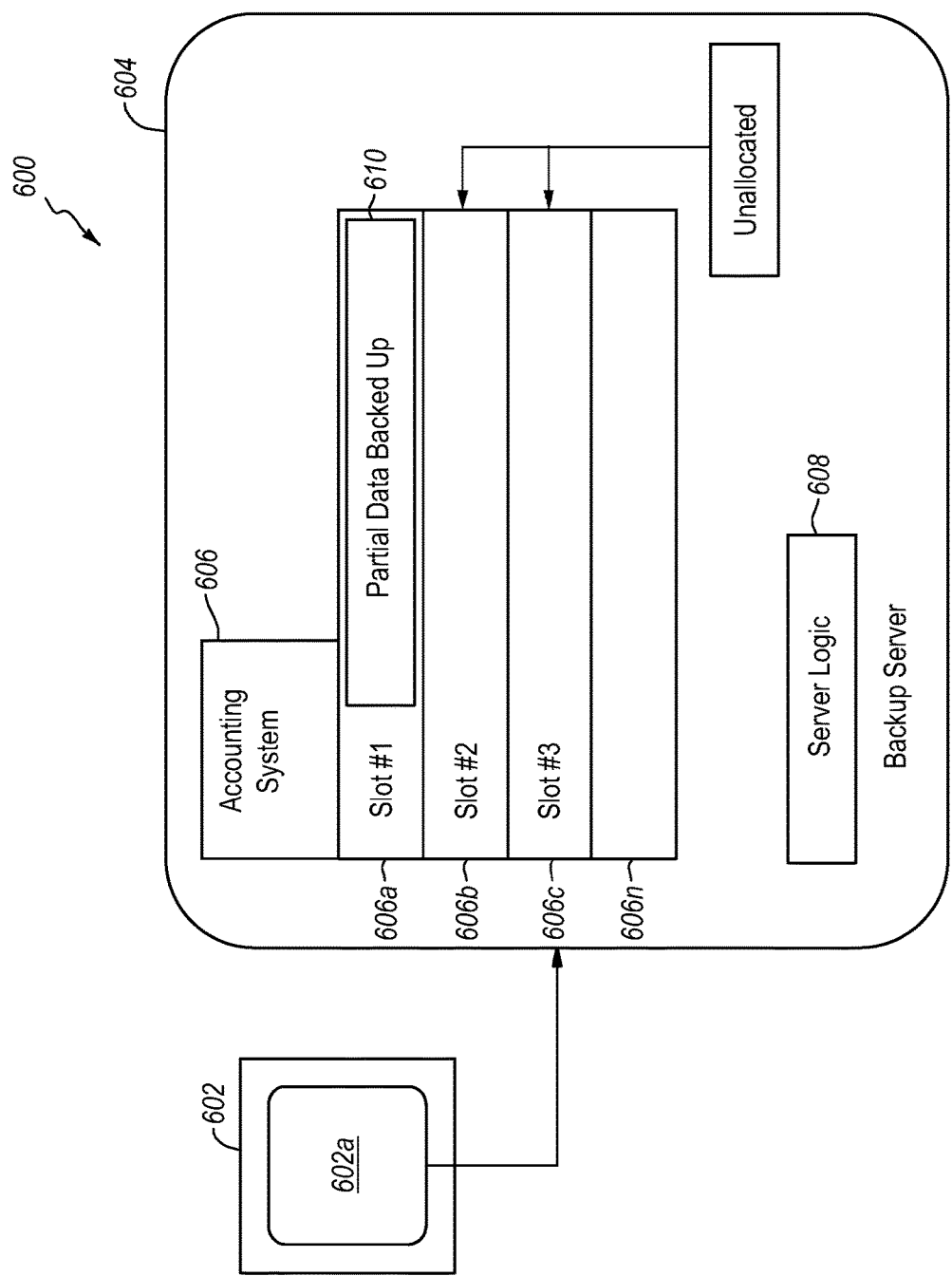

With reference now to FIG. 3, the cumulative backup application 602a of node 602 has generated a backup of node 602 that is then stored as partial backup 610 in slot 606a. In general, performing a backup of node 602 involves backing up the data of interest, creating the metadata necessary to describe the data that has been backed up, and assembling the metadata together with the backed up data. This metadata can include, for example, final root metadata and other accounting information that is to be recorded at the backup server 604 in association with the backed up data. The data backup, metadata creation, and assembly are performed by the cumulative backup application 602a. The assembled partial backup can then be transmitted to the backup server.

Thus, when received and stored by the backup server 604, the partial backup 610 is in the form of an assembled partial backup, that is, a partial backup whose data and metadata have been transmitted to, and stored on, the backup server 604, but which has not yet been recorded in the accounting system 606 as complete. By virtue of its status as an assembled, but as yet unrecorded, partial backup, the partial backup 610 is, initially, inaccessible for any operations except recording. After both the existence, and metadata, of the partial backup 610 are merged into the cumulative backup, such as by the server logic 608, in the slot 606a, the partial backup 610 may then be accessible via the cumulative backup for selected operations, examples of which are discussed herein in connection with the 'hidden' flag.

In addition to the foregoing circumstances, flags may be required in other cases as well. For example, where an MCS is employed, the MCS may also require a flag for access to the partial backup. If present, the MCS can provide centralized management including scheduling of backups, restore of backups, monitoring and reporting.

In terms of its scope and content, the partial backup 610 may be a full backup of node 602 or may be a backup of only part of node 602 and, in general, can be directed to any portion of the data residing at node 602. The partial backup 610 forms part of a cumulative backup that has not yet been completed. It should be noted that, in general, any backup, such as the partial backup 610, that forms part of a cumulative backup is referred to herein as a partial backup by virtue of its nature as part of a cumulative backup. This is notwithstanding that in some instances the partial backup may be a backup of an entire node, or a backup of only a portion of a node. Consistent with the foregoing, a cumulative backup may span a single node, or multiple nodes.

As further indicated in FIG. 3, the remaining slots 606b . . . 606n remain unallocated and unused. Thus, even though a cumulative backup may be assembled from multiple constituent parts, those parts are not stored individually at the backup server 604 and, accordingly, only a single slot is ever required for the cumulative backup and its constituent parts. That is, the backup server is not required to either individually store or retain the constituent parts of a cumulative backup. As a result, the accounting system 606 may include considerably fewer entries than might otherwise be the case. As well, and depending upon the structure of the accounting system 606, embodiments of the invention can reduce the amount of backup storage space required.

Figure 4:
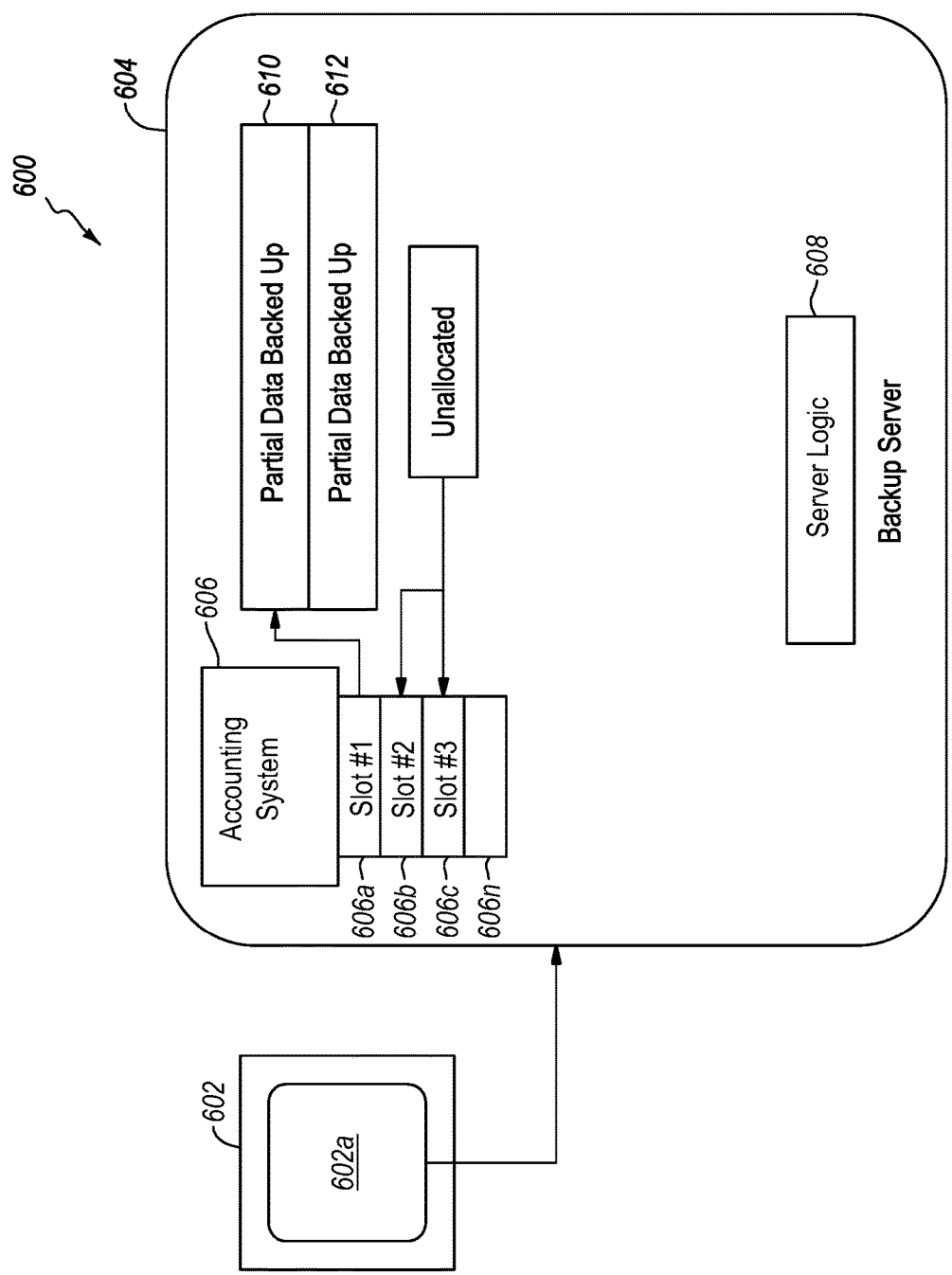

Turning now to FIG. 4, the first partial backup 610 and a second partial backup 612 are associated with a cumulative backup process, but have not yet been merged together. The request to merge the second partial backup 612 with the first partial backup 610, when made, originates with the cumulative backup application 602a on the node which sent the most recent partial backup, node 602 in this case. Although the request to merge, and the logic for doing so, may originate with the cumulative backup application 602a at the node 602, the logic may be executed by the backup server 200.

As further indicated in FIG. 4, only slot 606a has been allocated and is in use, notwithstanding that multiple partial backups, namely partial backup 610 and partial backup 612, have been sent to the backup server 600. Correspondingly, slots 606b . . . 606n remain unallocated and unused, at least in connection with the cumulative backup process with which partial backup 610 and partial backup 612 are associated.

Figure 5:
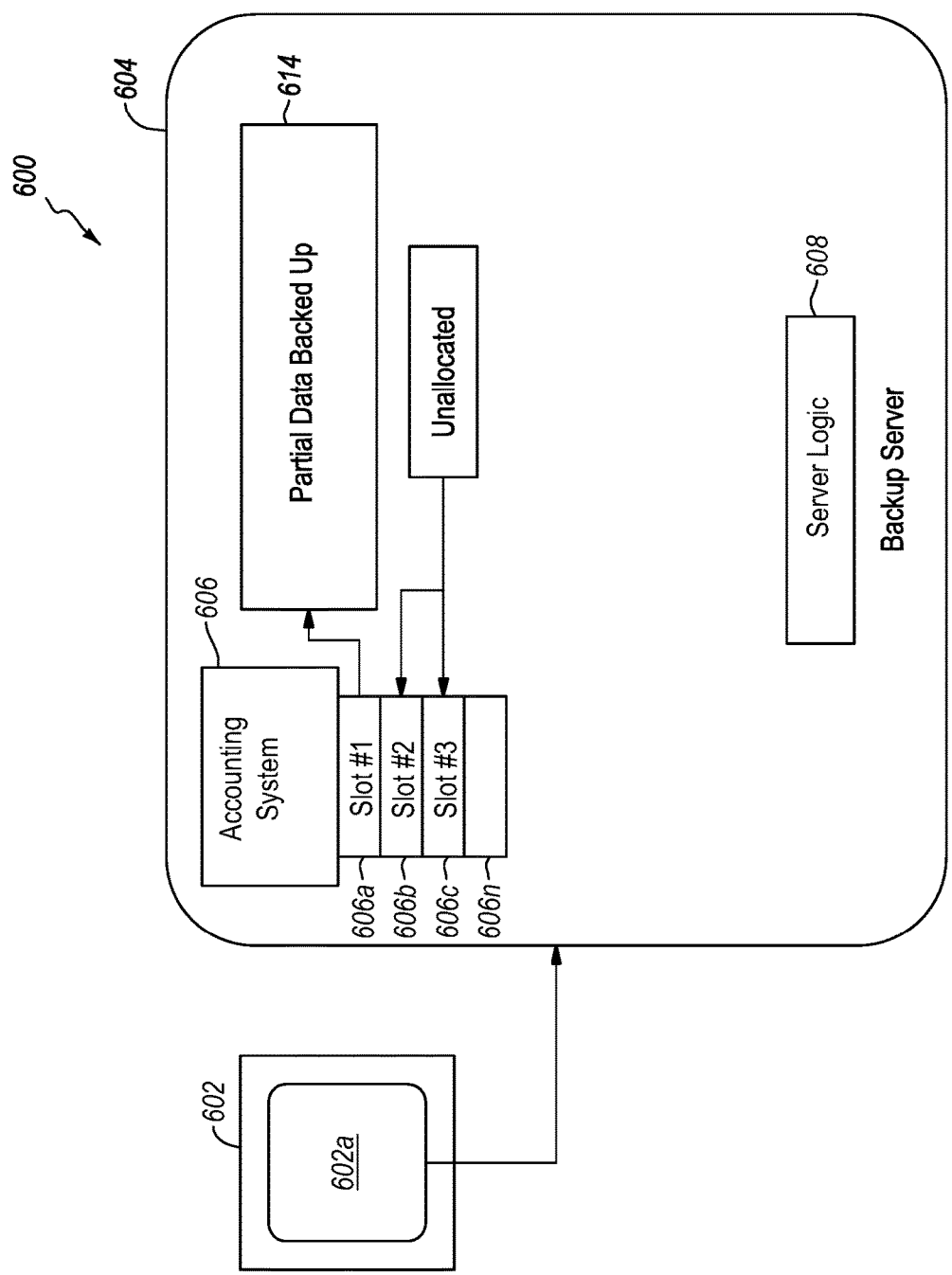

As indicated now in FIG. 5, once two or more partial backups, such as partial backup 610 and partial backup 612 for example, have been sent to the backup server 600, the multiple backups can be merged together to form a cumulative backup 614 that includes all the data from both of the partial backups 610 and 612. While shown in different respective Figures, it should be understood that partial backup 610 and partial backup 612 can be added to slot 606a at the same time, that is, in parallel with each other, or at substantially the same time. In other instances, partial backup 610 and partial backup 612 can be added to slot 606a in a serial fashion, that is, one before the other.

Likewise, partial backup 610 and partial backup 612 can be merged together immediately, or nearly so, after the partial backup 612 is received at the backup server 600. With reference briefly again to FIG. 4, it should be noted that while FIG. 4 shows partial backup 610 and partial backup 612 as existing separately prior to their merger, the partial backup 610 and partial backup 612 may exist in this separated state for only a very short time.

As noted earlier, the incomplete cumulative backup residing in the slot 606a is denoted as 'partial' through the use of a 'hidden' flag. One purpose of this marking is to enable subsequent partial backups to be appended to the data of the recorded, but incomplete, cumulative backup. As well, each partial backup is merged with the preceding partial backup, if only one exists, to form a cumulative backup that includes the two partial backups, or if a cumulative backup already exists, the received partial backup is merged with the already existing cumulative backup. That is, and as discussed in more detail elsewhere herein, each new partial backup can be merged into the whole and is not separately stored from the whole, nor does it require the allocation or use of its own respective slot 606.

As will be apparent from the foregoing discussion, a cumulative backup can exist in an incomplete state prior to the time that all the partial backups have been merged together, and in a completed state after all the partial backups have been merged together and locked. For the purposes of this disclosure, the term cumulative backup embraces both states.

As each partial backup is assembled, the cumulative backup application 602a can synchronize the partial backups before they are merged to help ensure that no parts of any partial backup are lost due to race conditions or conflicts. In general, synchronization involves a locking of the Backup ID on the backup server 604 so that the newly assembled partial backup can be merged into the recorded incomplete cumulative backup residing in the slot 606a. This synchronization can be performed by the cumulative backup application 602a, or by the server logic 608 at the direction of the cumulative backup application 602a. This process results in the generation of new root metadata, which can then be recorded in the slot 606a. When this recording is completed, the recorded incomplete cumulative backup can then be unlocked for the merger of one or more additional partial backups.

If the partial backup 612 is the final partial backup to be incorporated in the cumulative backup 614, the partial backup 612 can be designated 'final' by the cumulative backup application 602a. This designation indicates not only that further partial backups will not be appended to partial backup 612, but also that the server logic 608 should reset the 'hidden' flag so as to prevent any further modifications to the cumulative backup 614.

While the preceding discussion of FIGS. 2-5 has considered an arrangement where a cumulative backup is created using multiple partial backups from a single node, a cumulative backup can also be created using data from multiple different sources. Further details concerning the creation of such a cumulative backup are set forth below.

C. Cumulative Backup—Multiple Nodes

In addition to other aspects disclosed elsewhere herein, another useful aspect of the cumulative backup approach is that such a backup can be created using one or more partial backups from each of a plurality of different data sources. In general, such data sources include, but are not limited to, any node that can run a cumulative backup application and communicate with a backup server. As in the case of a single node implementation, the particular nodes and their respective data involved in a cumulative backup can be user-specified, or can be determined automatically according to predetermined criteria that may be user-specified.

With attention now to FIGS. 6-9, details are provided concerning an arrangement where a cumulative backup is generated using partial backups from each of a plurality of data sources. As the arrangement of FIGS. 6-9 is similar in many respects to that of FIGS. 2-5, only selected differences between the two arrangements are addressed below.

Figure 6:
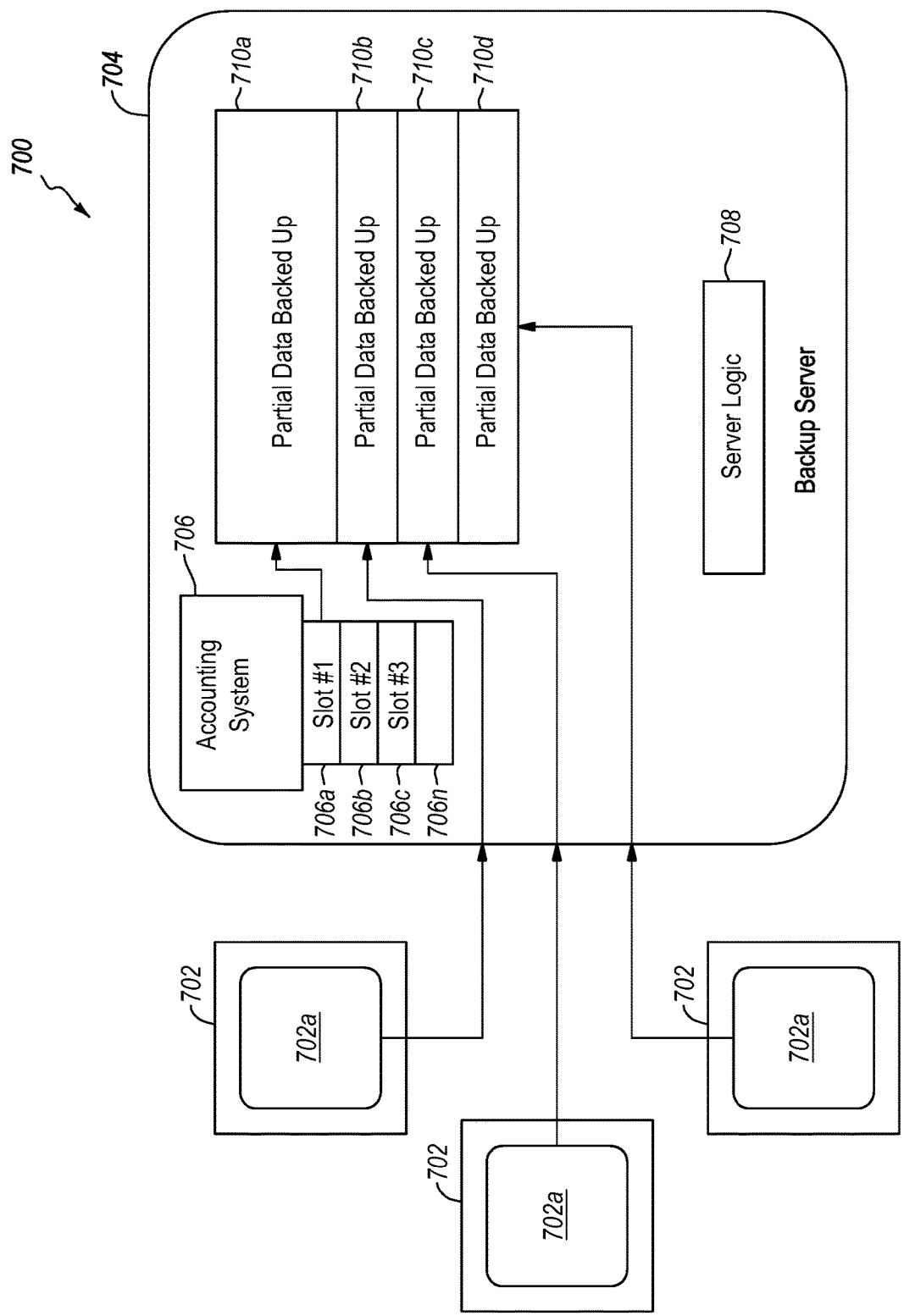
FIG. 6-9 disclose aspects of an example backup system configuration and associated methods.

Turning first to FIG. 6, an operating environment 700 may include multiple nodes 702 that each host an instance of a cumulative backup application 702a, such as the EMC Avtar application for example. There is no upper limit to the number of nodes 702 that can participate in a cumulative backup. The node 702, one or more of which may comprise, for example, a mail server such as an MS Exchange server, or a Lotus Notes server, communicate with a backup server 704, which can take the form of an EMC Avamar server. In general, the nodes 702 that will participate in the cumulative backup, and the data to be included in the partial backups 710a-710d can both be user specified, such as by way of server logic 708 at the backup server, at the nodes 702, and/or by way of a user interface (UI) at a management console server (MCS).

The backup server 704 includes an accounting system 706 that has, or is otherwise associated with, a plurality of slots 706a, 706b, 706c . . . 706n, each of which can be allocated for storage of a backup. In the example of FIG. 6, slot 706a (#1) has been allocated but no data has been stored yet in slot 706a. Allocation of slot 706a can be performed at the request of the cumulative backup application 702a.

Figure 7:
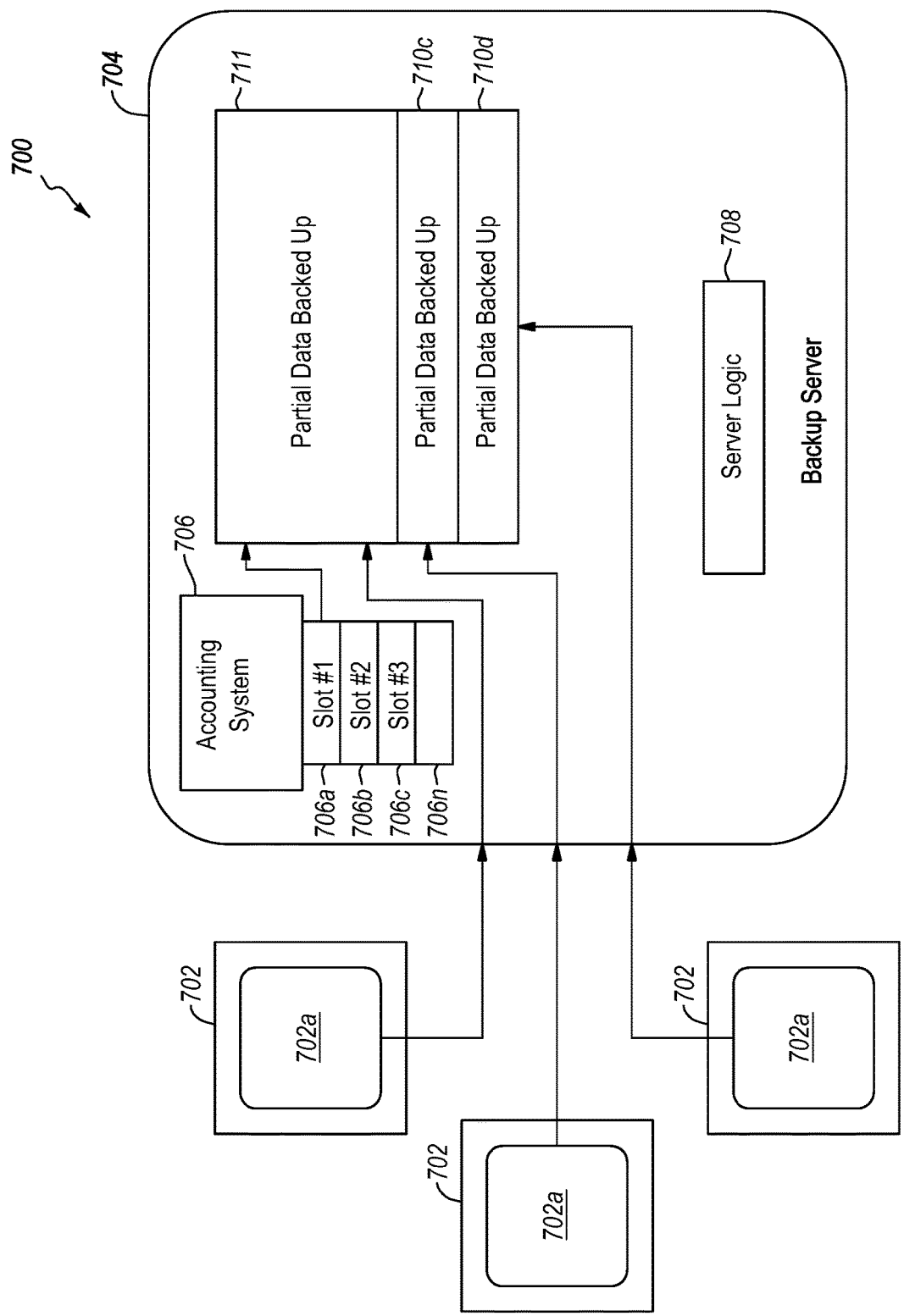

As indicated in FIG. 6, each of the nodes 702 contributes a respective partial backup, namely, partial backups 710b, 710c, and 710d. Each of the partial backups 710b, 710c, and 710d is appended to the respective preceding partial backup. Turning to FIG. 7, it can be seen that the client 702 that has created partial backup 710b has merged that partial backup with the partial backup 710a to form an incomplete cumulative backup 711. The other nodes 702 have not yet merged their respective partial backups 710c and 710d into the incomplete cumulative backup 711.

As noted similarly in the discussion of FIGS. 2-5, while FIG. 7 suggests a sequential merging of partial backups, it should be understood that a group of partial backups, such as partial backups 710b, 710 and 710d for example, can be merged together either serially, or substantially in parallel. Moreover, and as in the case of the partial backups in FIGS. 2-5, each of the partial backups 710b, 710 and 710d can be merged synchronously as they are assembled. Thus, the arrangement indicated in FIG. 7 is provided for the purposes of illustration and should not be construed to limit the scope of the invention in any way. As further indicated in FIGS. 6 and 7, the backup server 700 includes server logic 708 that synchronizes the partial backups before they are merged to help ensure that no parts of any partial backup are lost due to race conditions or conflicts.

Figure 8:
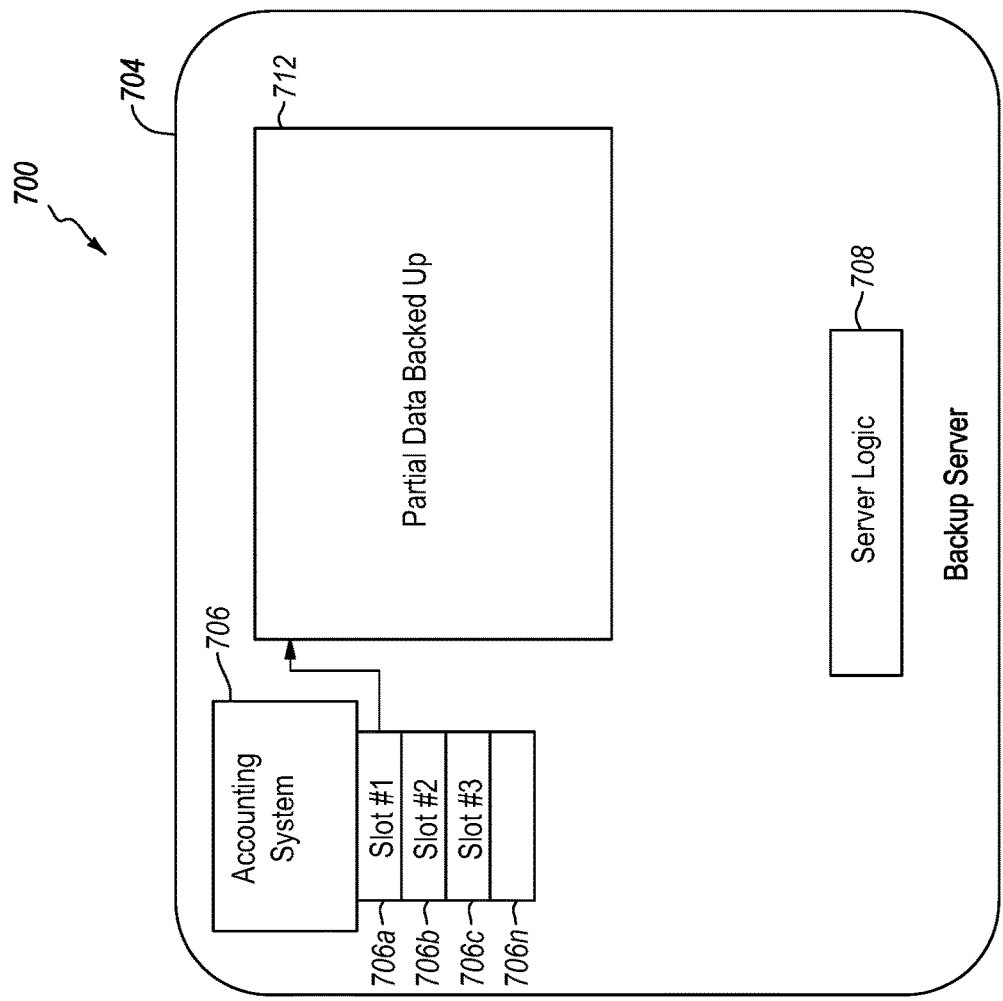
Figure 8:
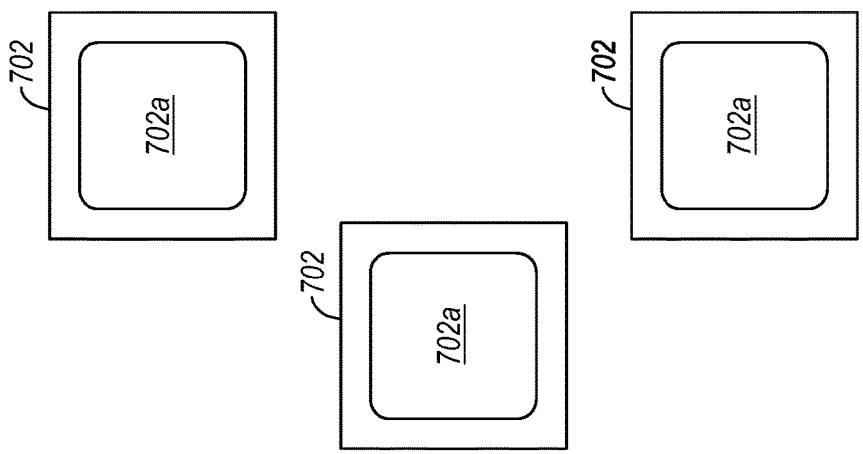
Figure 9:
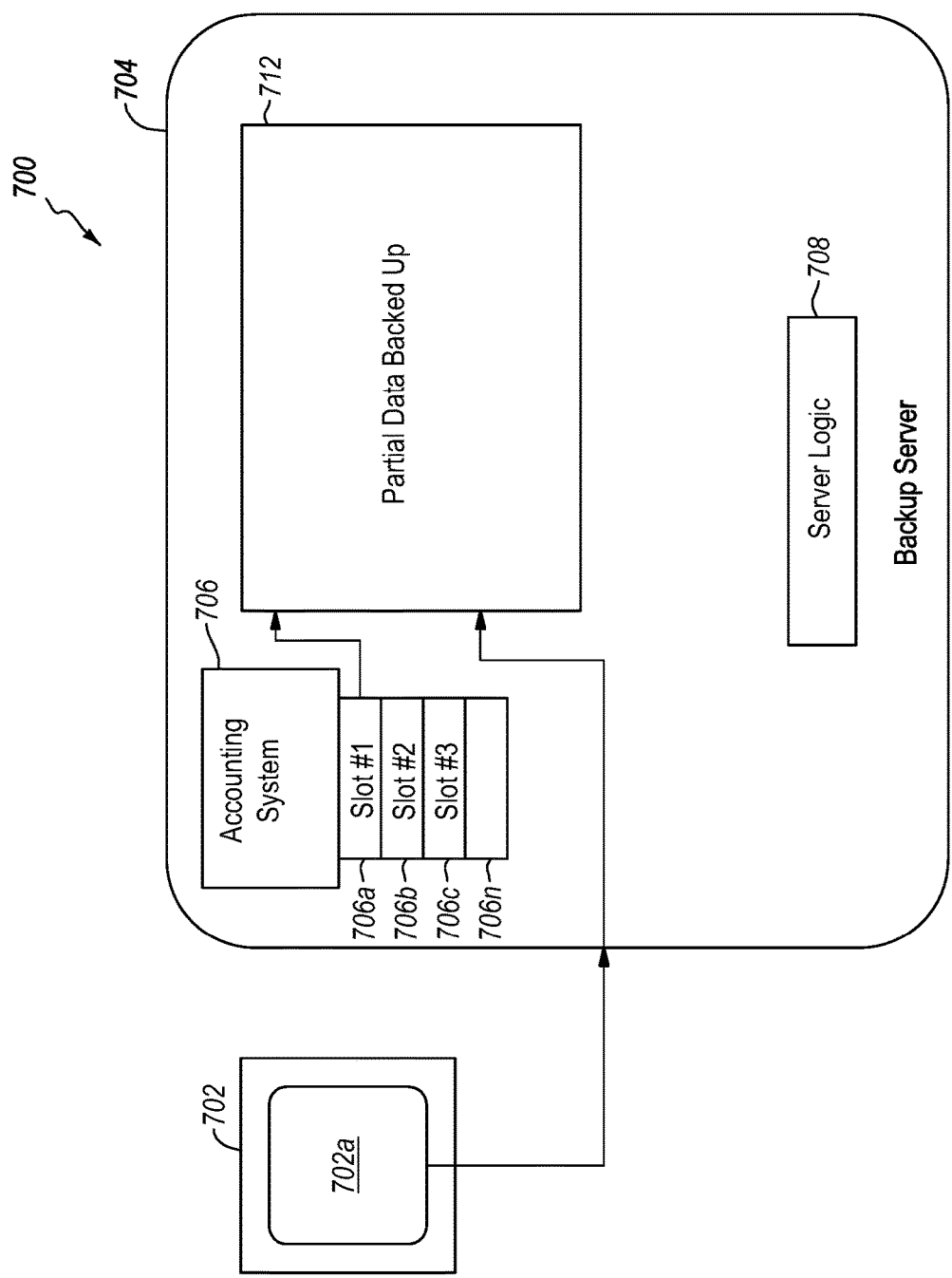

With reference now to FIGS. 8 and 9, it can be seen in FIG. 8 that all of the partial backups 710*a* . . . 710*d* have been merged together to form a complete and recorded, but not finalized, cumulative backup 712. In FIG. 9, the cumulative backup 712 is finalized by a separate activation of the cumulative backup application 702*a*. Alternatively, finalization may be implemented by whichever cumulative backup application 702*a* transmitted the final partial backup for inclusion in the cumulative backup 712. Where multiple nodes 702 transmit their respective partial backups substantially contemporaneously with each other, any of the associated instances of the cumulative backup application 702*a* can mark its respective partial backup as 'final.' In some instances, a user can designate which node 702 will designate its respective partial backup in this way. In any event, designation of a partial backup as 'final' serves to reset the 'hidden' flag of the cumulative backup, thus making that cumulative backup visible and accessible in its entirety, and henceforth no longer modifiable.

D. Example Cumulative Backup Methods

Figure 10:
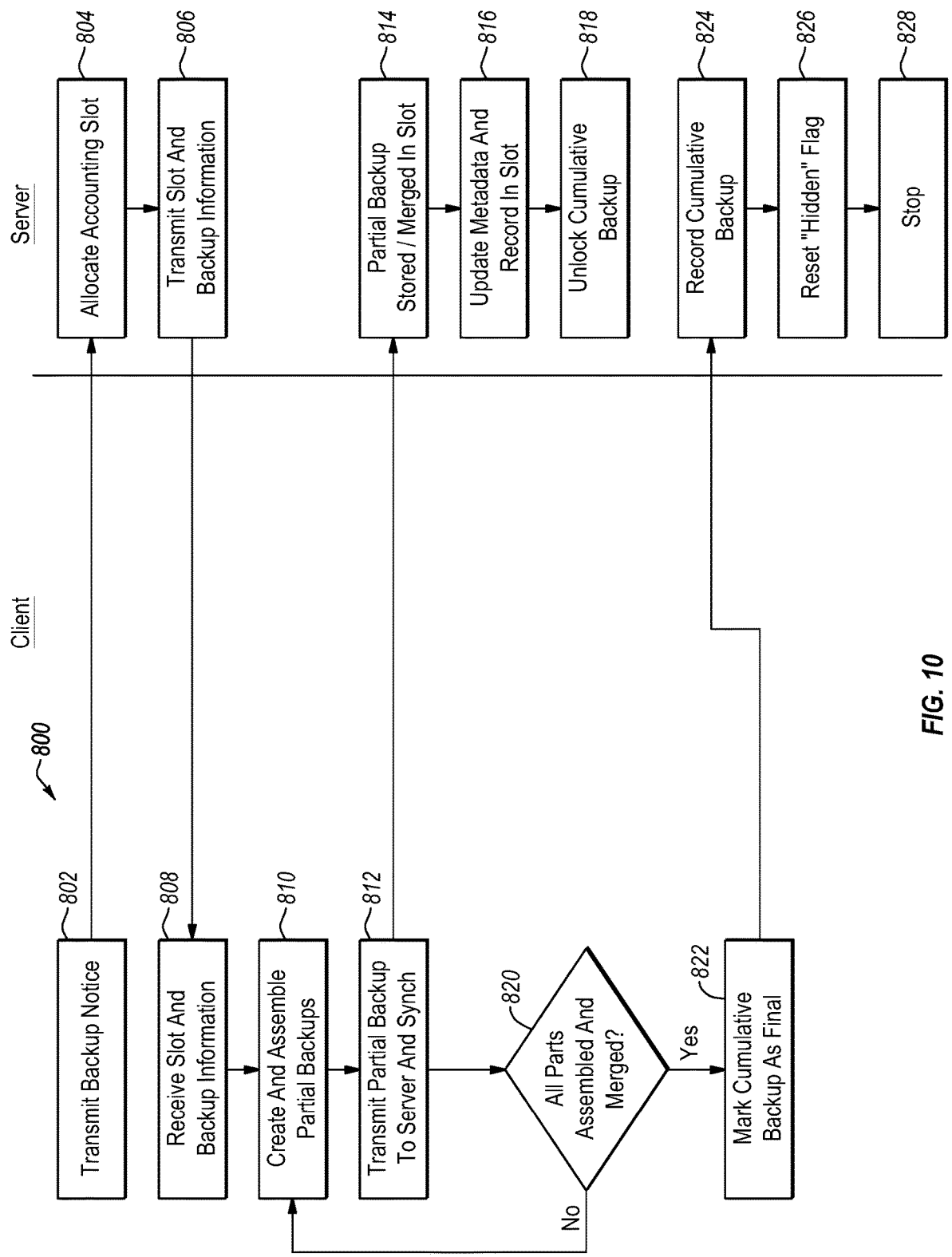
FIG. 10 discloses aspects of an example method for performing a cumulative backup process.

Turning now to FIG. 10, details are provided concerning a method for performing a cumulative backup, one example of which is denoted at 800. It should be noted that the method 800 can be performed with a single data source, such as a node, performing multiple partial backups, or with multiple data sources, each of which performs one or more backups. Moreover, while reference is made in the following discussion to a single client, it should be understood that unless otherwise noted, the client processes of the method 800 can be performed by multiple clients, and at substantially the same time as each other.

The method can begin at 802 where a cumulative backup application at a node such as a client transmits a backup notice, such as "begin cumulative backup," to a backup server. At 804, the backup server receives the backup notice and allocates a slot for the cumulative backup in the accounting system of the backup server.

Where multiple clients participate in the method 800, only a single slot is needed since the partial backups of all of the participating clients will be merged into a single cumulative backup that occupies only a single slot in the accounting server of the backup system. This request can be supplied by any of the clients, the identity of which can be specified by a user, or determined based on default or other criteria. After the slot has been reserved 804 at the backup server, the backup server transmits 806 the slot information, such as Backup ID for example, using the current time as the Creation Time for the cumulative backup, and at 808 that information is received by the cumulative backup application at the client.

One or more partial backups are then created and assembled 810 at the client and/or one or more other clients. Such a partial backup may include all, or a portion of, data resident at the client and some or all of the backed up data may be deduplicated data, although that is not required. Regardless of whether part, or all, of the data at a client is backed up, the resulting backup is referred to as a partial backup inasmuch as it comprises only part of a cumulative backup. The assembled partial backup includes, in addition to the client data, metadata concerning that data. At 812, the assembled partial backup is then transmitted to the backup server and synchronized. In at least some embodiments, the cumulative backup application synchronizes the partial backup by locking the Backup ID so that the newly assembled partial backup can be merged 814 by the cumulative backup application, using the same Backup ID and Creation Time as at 806, into the recorded incomplete cumulative backup that resides in the slot. It should be noted that if the partial backup is the first to be created, no merger is required and the partial backup is stored in the reserved slot.

Next, the recorded metadata associated with the recorded incomplete cumulative backup is updated 816 to include the metadata of the newly assembled partial backup so as to create, for example, new root metadata. As part of 816, the new root metadata is then recorded in the accounting slot in association with the updated incomplete cumulative backup. This recordation involves overwriting the existing metadata of the recorded incomplete cumulative backup with the new root metadata. The incomplete cumulative backup can then be unlocked 818 for the merger of one or more additional partial backups.

At 820, a check is performed to determine whether or not all of the partial backups required for the cumulative backup have been assembled and merged. If they have not, the process 800 returns to 810. On the other hand, if all of the partial backups required for the cumulative backup have been assembled and merged, a final execution of the cumulative backup application marks the cumulative backup in the slot as final 822.

The cumulative backup is then recorded 824 at the backup server. The recording of the cumulative backup includes recording information that is unique to the cumulative backup, such as the creation time of the cumulative backup and a root metadata reference for the cumulative backup. Non-unique information can also be associated and stored with the cumulative backup. In at least some implementations, the backup is stored in a location other than the slot, but a link stored in the slot can be used to associate the slot with the stored backup. The creation time and root metadata reference enable the cumulative backup application to later read, list and restore the cumulative backup to one or more target machines, one of which can be the node where the cumulative backup application resides.

After recording of the cumulative backup, the 'hidden' flag is reset 826 by the backup server, sealing the cumulative backup against any further modifications, and making the cumulative backup visible without the need for any special flags. The method 800 then stops at 828.

E. Example Restore Process

Figure 11:
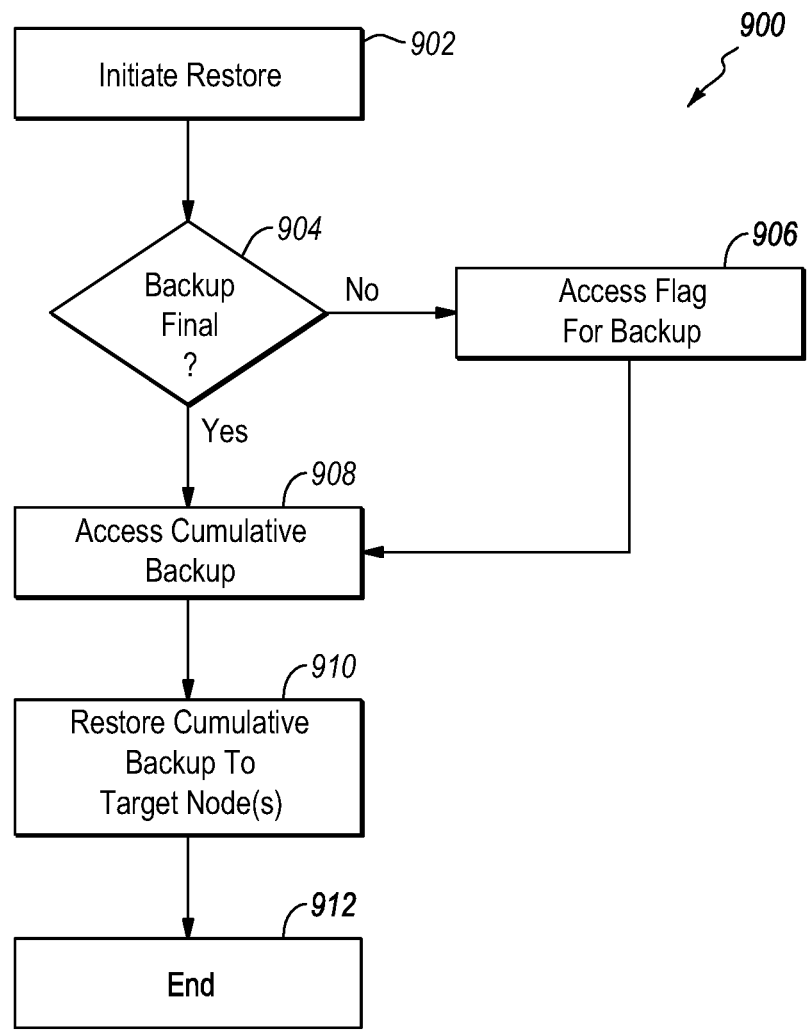
FIG. 11 discloses aspects of an example method for performing a restore process using a cumulative backup.

With regard, finally, to FIG. 11, details are disclosed concerning aspects of an example method 900 for performing a restore process using a cumulative backup. The method 900 can be performed by a backup server, or at the direction of a backup server, or cumulative backup application residing on a node such as a client.

At 902, the restore process is initiated. The initiation can be initiated based on a user request, a predetermined schedule, the occurrence or non-occurrence of a particular event, and/or any other criteria. As well, the request for initiation of the restore process can originate with a client, a user, and/or by way of an MCS.

A check is performed at 904 to determine if the cumulative backup targeted for the restore process has been finalized or not. If the cumulative backup has not been finalized, an access flag for the cumulative backup is accessed 906 to enable performance of the restore operation. After the access flag has been accessed, the method 900 advances to 908 where the cumulative backup is accessed. If, on the other hand, a determination is made 904 that the cumulative backup targeted for the restore process has been finalized, the method 900 advances to 908 where the cumulative backup is accessed. The cumulative backup can be accessed based on any suitable criteria including, for example, slot number, label, Backup ID and/or Creation time.

When the cumulative backup has been accessed 908, the method 900 can advance to 910 where the cumulative backup is used to restore one or more target nodes. Examples of such target nodes include one or more clients, such as servers, that can be physical or virtual machines. At the conclusion of a successful restore using the cumulative backup, the method 900 ends 912.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated.

In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   in response to receipt, by a backup server, of a backup notice from a node, transmitting by the backup server to the node, a confirmation that a slot in an accounting system has been reserved by the backup server;
   merging, by the backup server, a plurality of partial backups together with any data present in the slot so as to create or modify a cumulative backup in the slot, and one of the partial backups comprises data generated at the node; and
   performing, at the backup server, a backup restore process that comprises the following operations:
      receiving, from the node, a request for restoration of the cumulative backup;
      checking the cumulative backup to determine whether or not the cumulative backup has been finalized;
      after checking the cumulative backup, accessing the cumulative backup when it has been determined that the cumulative backup has been finalized; and
      restoring the cumulative backup to a target node.

2. The method as recited in claim 1, wherein when it is determined that the cumulative backup has not been finalized, the method further comprises accessing a flag to enable performance of restoration of the cumulative backup to the target node.

3. The method as recited in claim 1, wherein the partial backups that make up the cumulative backup are not individually accessible at the backup server by the node from which the request for restoration was received.

4. The method as recited in claim 1, wherein the plurality of partial backups are not stored separately from each other at the backup server.

5. The method as recited in claim 1, wherein the target node is the node from which the request for restoration was received by the backup server.

6. The method as recited in claim 1, wherein all of the partial backups originate from the same node.

7. The method as recited in claim 1, wherein the partial backups collectively originate from a plurality of different nodes.

8. The method as recited in claim 1, wherein the cumulative backup is restored to another node in addition to the target node.

9. A non-transitory storage medium having stored therein instructions which are executable by one or more hardware processors to:
perform, at a backup server, a process that comprises the following operations:
in response to receipt, by the backup server, of a backup notice from a node, transmitting by the backup server to the node, a confirmation that a slot in an accounting system has been reserved by the backup server;
merging, by the backup server, a plurality of partial backups together with any data present in the slot so as to create or modify a cumulative backup in the slot, and one of the partial backups comprises data generated at the node;
receiving, from the node, a request for restoration of the cumulative backup;
checking the cumulative backup to determine whether or not the cumulative backup has been finalized;
after checking the cumulative backup, accessing the cumulative backup when it has been determined that the cumulative backup has been finalized; and
restoring the cumulative backup to a target node.

10. The non-transitory storage medium as recited in claim 9, wherein the partial backups that make up the cumulative backup are not individually accessible at the backup server by the node from which the request for restoration was received.

11. The non-transitory storage medium as recited in claim 9, wherein the plurality of partial backups are not stored separately from each other at the backup server.

12. The non-transitory storage medium as recited in claim 9, wherein the target node is the node from which the request for restoration was received by the backup server.

13. The non-transitory storage medium as recited in claim 9, wherein when it is determined that the cumulative backup has not been finalized, the operations further comprise accessing a flag to enable performance of restoration of the cumulative backup to the target node.

14. The non-transitory storage medium as recited in claim 9, wherein all of the partial backups originate from the same node.

15. The non-transitory storage medium as recited in claim 9, wherein the partial backups collectively originate from a plurality of different nodes.

16. The non-transitory storage medium as recited in claim 9, wherein the cumulative backup is restored to another node in addition to the target node.

\* \* \* \* \*